US009933528B2

(12) United States Patent
Horn et al.

(10) Patent No.: US 9,933,528 B2
(45) Date of Patent: Apr. 3, 2018

(54) SYSTEMS AND METHODS FOR REAL TIME KINEMATIC SATELLITE POSITIONING

(71) Applicant: Swift Navigation, Inc., San Francisco, CA (US)

(72) Inventors: Ian Maxwell Horn, San Francisco, CA (US); Fergus MacPherson Noble, Emeryville, CA (US)

(73) Assignee: Swift Navigation, Inc., San Francisco, CA (US)

( * ) Notice: Subject to any disclaimer, the term of this patent is extended or adjusted under 35 U.S.C. 154(b) by 487 days.

(21) Appl. No.: 14/621,187

(22) Filed: Feb. 12, 2015

(65) Prior Publication Data

US 2016/0116601 A1 Apr. 28, 2016

Related U.S. Application Data

(60) Provisional application No. 62/069,153, filed on Oct. 27, 2014.

(51) Int. Cl.
*G01S 19/44* (2010.01)
*G01S 19/51* (2010.01)

(52) U.S. Cl.
CPC ............ *G01S 19/44* (2013.01); *G01S 19/51* (2013.01)

(58) Field of Classification Search
CPC .......... G01S 19/38; G01S 19/40; G01S 19/41; G01S 19/42; G01S 19/425; G01S 19/43; G01S 19/44; G01S 19/45; G01S 19/46; G01S 19/51; G01S 5/0036; G01S 5/0027; G01S 5/0054; G01S 21/28
See application file for complete search history.

(56) References Cited

U.S. PATENT DOCUMENTS

| 5,610,614 A * | 3/1997 | Talbot | G01C 15/00 342/352 |
| 2004/0145518 A1* | 7/2004 | Toda | G01S 19/55 342/357.27 |
| 2006/0279455 A1* | 12/2006 | Bird | G01S 19/44 342/357.41 |
| 2010/0073226 A1* | 3/2010 | Henkel | G01S 19/44 342/357.27 |
| 2011/0115669 A1* | 5/2011 | Milyutin | G01S 19/20 342/357.27 |

OTHER PUBLICATIONS

Chiu et al; "Bierman-Thornton UD Filtering for Double-Differenced Carrier Phase Estimation Accounting for Full Mathematical Correlation," Jan. 2008, ION NTM 2008, pp. 756-762.*

* cited by examiner

*Primary Examiner* — Gregory C. Issing
*Assistant Examiner* — Daniel P Malley, Sr.
(74) *Attorney, Agent, or Firm* — Jeffrey Schox; Thomas Gwinn

(57) ABSTRACT

A method for Real Time Kinematic satellite positioning includes receiving navigation satellite carrier signals, receiving phase correction signals from a reference station, calculating a set of integer phase ambiguities from double-differenced measurements of pseudo-range and phase, and calculating a relative position of the mobile receiver from the set of integer phase ambiguities and the double-differenced measurements of pseudo-range and phase.

15 Claims, 5 Drawing Sheets

SYSTEMS AND METHODS FOR REAL TIME KINEMATIC SATELLITE POSITIONING

CROSS-REFERENCE TO RELATED APPLICATIONS

This application claims the benefit of U.S. Provisional Application Ser. No. 62/069,153, filed on 27 Oct. 2014, which is incorporated in its entirety by this reference.

TECHNICAL FIELD

This invention relates generally to the satellite-based positioning field, and more specifically to new and useful systems and methods for Real Time Kinematic (RTK) satellite positioning in the satellite-based positioning field.

BACKGROUND

Being able to perform high precision satellite positioning is important for a wide variety of applications. Unfortunately, current GPS solutions are often either inaccurate or require processor power beyond the capabilities of inexpensive mobile hardware. Thus, there is the need in the satellite-based positioning field to create systems and methods for Real Time Kinematic (RTK) satellite positioning. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. RTK Satellite Positioning System

Figure 1:
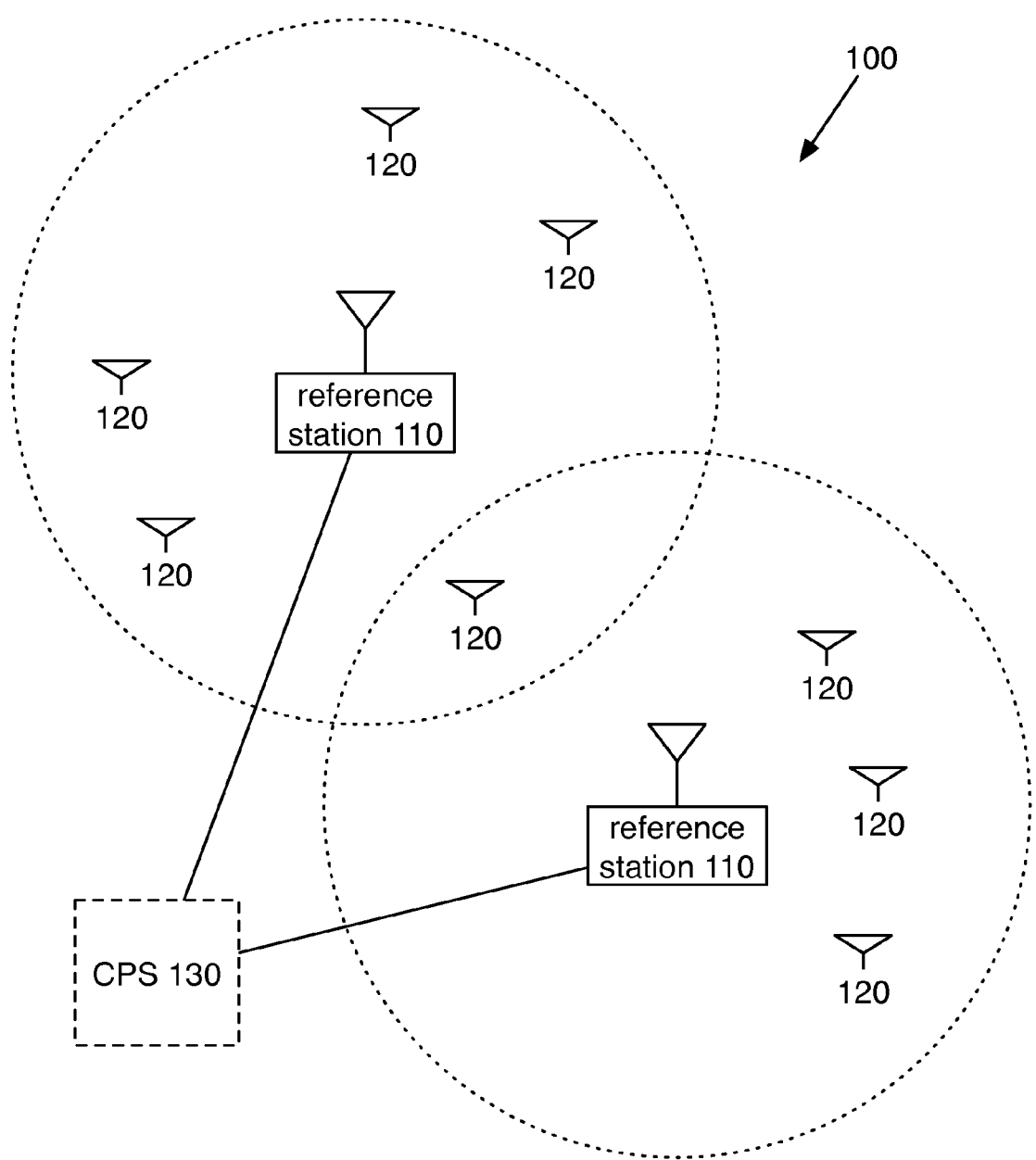
FIG. 1 is a diagram view of a system of a preferred embodiment.

As shown in FIG. 1, a Real Time Kinematic (RTK) satellite positioning system 100 includes one or more reference stations 110 and a mobile receiver 120. The system 120 may additionally include a central processing server 130.

The system 100 functions to estimate the position of the mobile receiver 120 with high accuracy using RTK satellite navigation. Typical satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

Figure 2:
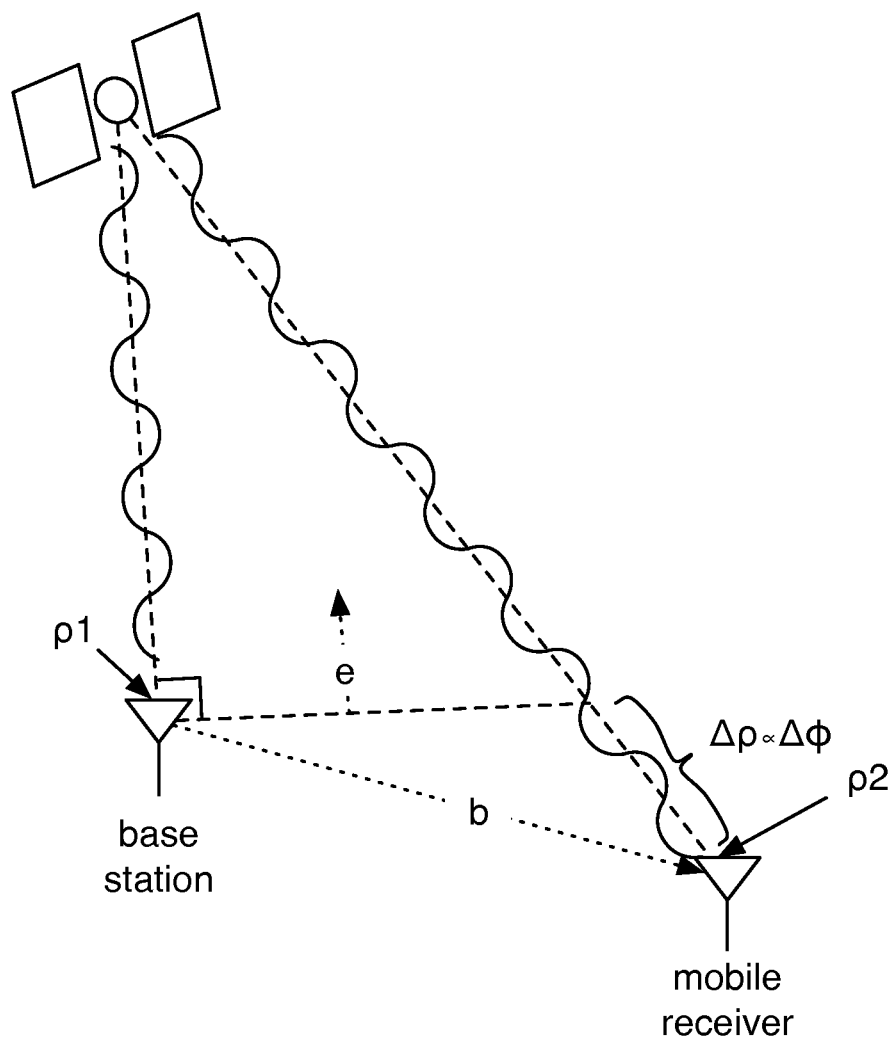
FIG. 2 is a diagram view of RTK signal reception.

Instead of solely using the content of satellite signals, RTK makes use of satellite signal carriers to determine position. Both a reference station receiver and a mobile receiver measure the phase of a received carrier signal, as shown in FIG. 2. If the difference in absolute phase between the signal received at the reference station (also referred to as a base station) and the signal received at the mobile receiver can be found, the position of the mobile receiver relative to the reference station can be found (this relative position may be represented as the vector b). Note that it may be difficult to determine difference in absolute phase—because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-\pi$, $5\pi$, etc.). This problem is known as integer ambiguity.

If the relative position can be found and the position of the reference station is known with high accuracy, the position of the mobile receiver can be found with accuracy on the order of centimeters (by referencing the RTK-determined relative position to the position of the reference station). Limits on positioning accuracy are preferably limiting factors in determination of relative position (i.e., the reference position is known with higher accuracy/precision than the relative position); alternatively, it may be more important to determine relative position (i.e., relative position is known with higher accuracy/precision than the reference position).

The system 100 functions to perform satellite positioning using a novel form of RTK (described in the sections covering the method 200). Mobile receivers 120 of the system 100 are preferably able to achieve centimeter-level relative positioning while maintaining a small form factor, low cost, and low power consumption. The advantages in accuracy, size, cost, and power consumption preferably enable mobile receivers 120 to be used in applications where previous GNSS solutions were not accurate enough, too large, too expensive, and/or too power hungry. Applications that may be of particular interest to purchasers of mobile receivers 120 include autonomous vehicle guidance (e.g., for UAVs or agricultural equipment), GPS/GNSS research, and surveying systems. Additionally, the mobile receivers 120 are preferably designed to utilize open-source firmware, allowing them to be easily customized to particular demands of end user applications, easing system integration and reducing host system overhead.

The reference stations 110 function to transmit phase data of signals received at the reference stations 110. The reference stations no utilized by the system 100 are preferably public reference stations, but may additionally or alternatively be private reference stations or any other suitable reference stations.

Reference stations 110 preferably have a location known to a high degree of accuracy. Reference station 110 location is preferably the location of the antenna used to receive satellite signals. Reference station 110 location may be determined in any manner yielding a high degree of accuracy; for example, reference station 110 location may be determined by a number of single frequency carrier phase receivers set around the reference station no at vertical and horizontal reference points. Note that while reference stations no are preferably fixed in location, they may additionally or alternatively be mobile. Station position is preferably re-determined to high accuracy before moved reference stations no re-start providing phase data; additionally or alternatively, reference stations no may provide phase data before location re-determination (for example, for use in attitude estimation). As another alternative, reference stations no may not provide absolute location data at all if not needed; for example, absolute location data of the reference station no may not be needed for applications including attitude estimation.

Reference stations 110 preferably provide phase data for multiple satellite signals and the location of the reference station via the internet, but may additionally or alternatively provide data by any other suitable method (e.g., transmission by UHF-band radio modem). Reference station no data is preferably made available directly to mobile receivers 120, but may additionally or alternatively be processed or aggregated before being made available to mobile receivers 120.

In one variation of a preferred embodiment, data from multiple reference stations 110 is combined at a server (e.g., the central processing server 130); the server uses the reference station no data to create a virtual reference station. Error in relative positioning of a mobile receiver 120 increases with the distance from the reference station no. By comparing data from multiple reference stations 110, distance-dependent systematic errors (e.g., those caused by ionospheric and tropospheric refractions or satellite orbit errors) can be modeled more precisely. The server can then use these error models to predict the reference data that would be transmitted by a reference station near the mobile receiver 120; from this prediction, data from a 'virtual reference station' with a location near the mobile receiver 120 can be transmitted to the mobile receiver 120 and used to increase mobile receiver 120 positioning accuracy.

The mobile receiver 120 functions to calculate a position relative to one or more reference stations 110 of known location using signals transmitted from one or more positioning satellites (preferably at least 3, but alternatively any number) and reference data from the reference stations no. The mobile receiver 120 preferably calculates position data using the method 200, but may additionally or alternatively calculate position data in any suitable manner. Mobile receivers 120 may additionally or alternatively serve as reference stations no for other mobile receivers 120.

Figure 3:
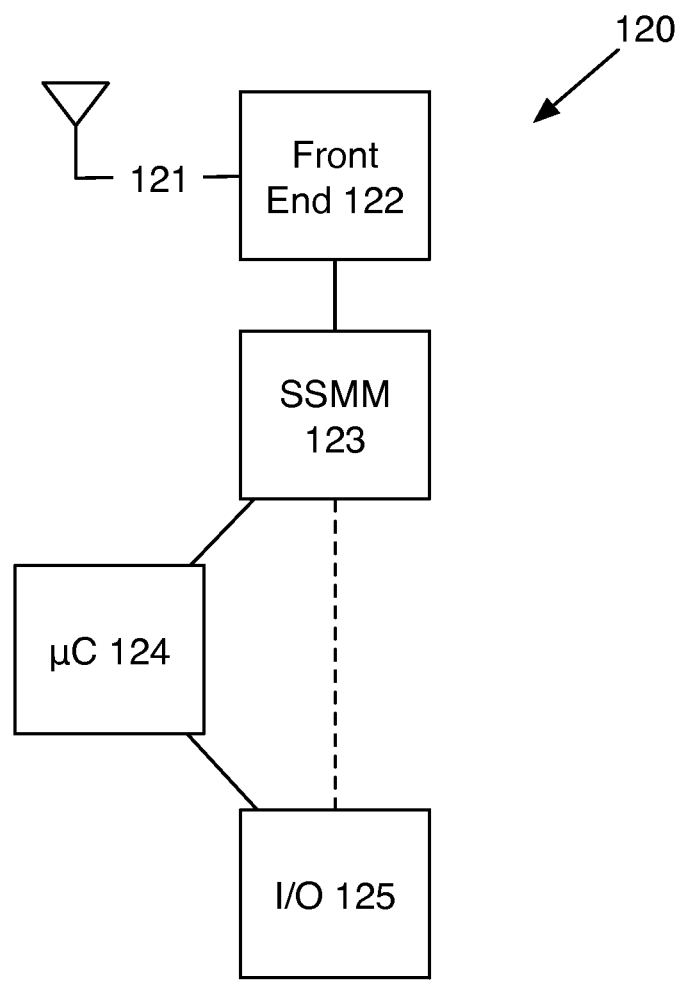
FIG. 3 is a chart view of a mobile receiver of a system of a preferred embodiment.

As shown in FIG. 3, the mobile receiver 120 preferably includes an antenna coupler 121, a front-end module 122, a satellite signal management module 123, a microcontroller 124, and an input/output module 125.

The antenna coupler 121 functions to couple a satellite signal-ready antenna to the mobile receiver 120 (additionally or alternatively, the mobile receiver 120 may include an antenna, such as a patch antenna).

Antennas coupled by and/or included with the antenna coupler 121 are preferably made out of a conductive material (e.g., metal). The antennas may additionally or alternatively include dielectric materials to modify the properties of the antennas or to provide mechanical support.

The antennas may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The antennas can additionally include one or more type of antennas, and the types of antennas can include any suitable variations. The antenna structure may be static or dynamic (e.g., a wire antenna that includes multiple sections that may be electrically connected or isolated depending on the state of the antenna). Antennas may have isotropic or anisotropic radiation patterns (i.e., the antennas may be directional). If antennas are directional, their radiation pattern may be dynamically alterable; for example, an antenna substantially emitting radiation in one direction may be rotated so as to change the direction of radiation.

If the antenna coupler 121 couples to multiple antennas, the antenna coupler 121 may split power between them using a splitter; additionally or alternatively, the antenna coupler 121 may include a switch to select between the multiple antennas, or the antenna coupler 121 may couple to the antennas in any suitable manner.

The front-end module 122 functions to convert signals received by the antenna coupler 121 to digital baseband signals for processing. The front-end module 122 includes an analog-to-digital converter (e.g., the Maxim MAX2769) capable of operating at high sample rates. The front-end module 122 is preferably capable of receiving L1 GPS, GLONASS, Galileo, and SBAS signal bands. The front-end module 122 may additionally or alternatively be capable of receiving additional bands (e.g., L2 GPS) or the mobile receiver 120 may include multiple front-end modules 122 for different bands.

The satellite signal management module 123 functions to perform satellite signal tracking and acquisition. The satellite signal management module 123 may additionally or alternatively include programmable digital notch filters for performing continuous wave noise nulling. The satellite signal management module preferably includes flexible and fully programmable correlators that may be used by the microcontroller 124 to implement tracking loops and acquisition algorithms. The satellite signal management module 123 is preferably implemented on an FPGA, allowing the firmware to be altered to enable adaptation of the mobile receiver 120 to various applications. Additionally or alternatively, the satellite signal management module 123 may be implemented by any suitable circuit.

The microcontroller 124 functions to perform signal processing above the correlator level on the mobile receiver 120 (e.g., tracking loop filters, acquisition management, navigation processing, etc.). The microcontroller 124 additionally or alternately manages communication over the input/output module 125. The microcontroller 124 preferably is able to calculate position, velocity, time (PVT) solutions at a rate of 50 Hz or higher, but may additionally or alternatively calculate PVT solutions at any suitable rate.

The input/output module 125 functions to allow for data to be transmitted from or received by the mobile receiver 120. The input/output module 125 is preferably used to couple the mobile receiver 120 to a UHF radio modem, so that the mobile receiver 120 may receive reference station correction signals over the UHF radio modem. The input/output module 125 may additionally or alternatively be used for any other suitable transmission or reception of data from the mobile receiver 120 (e.g., the mobile receiver 120 may transmit raw navigation data over the input/output module 125 to a control computer on a UAV, or the mobile receiver 120 may transmit data through a Bluetooth or cellular modem connected to the input/output module 125). The input/output module 125 preferably includes one or more UART connections, but may additionally or alternatively include connections for any other suitable input/output communications; for example, the input/output module 125 may include a USB port.

The central processing server 130 functions to process data from reference stations 110 and mobile receivers 120. The central processing server 130 may process this data for multiple purposes, including aggregating position data (e.g., tracking multiple mobile receivers 120), system control (e.g., providing flight directions to a UAV based on position data received from a mobile receiver 120 attached to the UAV), and/or position calculation (e.g., performing calculations for mobile receivers 120 that are offloaded due to limited memory or processing power). The central processing server 130 may additionally or alternatively process data to perform integer ambiguity calculations, used in determining RTK position solutions. The central processing server 130 may additionally or alternatively manage reference stations 110 or generate virtual reference stations for mobile receiver 120 based on reference station 110 data. The central processing server 130 may additionally or alternatively serve as an internet gateway to mobile receiver 120 data if mobile receivers 120 are not internet connected directly. The central processing server 130 is preferably an internet-connected general-purpose computer, but may additionally or alternatively comprise any suitable hardware.

2. RTK Satellite Positioning Method

Figure 4:
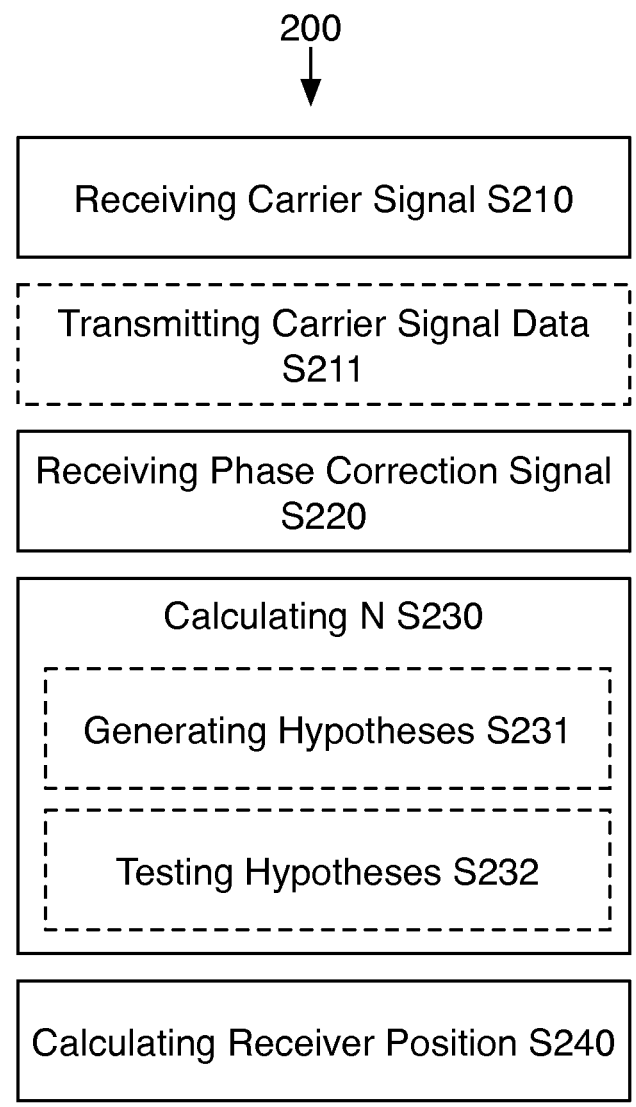
FIG. 4 is a chart view of a method of a preferred embodiment.

As shown in FIG. 4, a method 200 for Real Time Kinematic (RTK) satellite positioning includes: at a mobile receiver, receiving a navigation satellite carrier signal S210, receiving a phase correction signal from a reference station S220, calculating integer phase ambiguity S230, and calculating receiver position S240.

Step S210 includes receiving a navigation satellite carrier signal. Step S210 functions to provide the mobile receiver with a phase measurement and a pseudo-range measurement that can be used, along with a phase correction signal (received in Step S220) to calculate receiver position. Navigation receiver carrier signals are preferably received at the L1 frequency (1575.42 MHz), but may additionally or alternatively be received at the L2 frequency (1227.60 MHz) or any other suitable frequency. Navigation satellite carrier signals received in Step S210 may include GPS signals, GLONASS signals, Galileo signals, SBAS signals and/or any other suitable navigation signal transmitted by a satellite.

Step S210 preferably includes receiving the navigation satellite carrier signal (which is an RF signal) at an RF antenna and converting the signal to a digital baseband signal. This digital baseband signal is preferably used for two tasks by Step S210: calculating the pseudo-range from the receiver to the satellite (using standard GNSS time-of-flight techniques) and measuring the relative phase of the carrier signal.

Step S210 is preferably performed for multiple satellites. The use of pseudo-range and phase data from multiple satellites can provide for more accurate positioning, as described in later sections.

If receiver carrier signals are received at both L1 and L2 frequencies, Step S210 may include combining the L1 and L2 frequency signals for each satellite to create a beat signal. The resulting signal (i.e., the beat signal) has a center frequency significantly lower than either the L1 or L2 signals (~347.82 MHz), which allows for a smaller set of possible integer ambiguity values for a given prior (e.g., if $|N|\leq 10$ for an L1 signal, $|N|\leq 2$ for the example beat signal). The resulting signal may additionally or alternatively possess other desirable properties (e.g., reduction in ionospheric error).

In a variation of a preferred embodiment, the method 200 includes Step S211: transmitting carrier signal data (e.g., pseudo-range and/or phase data) from the receiver to a remote computer (e.g., a computer at a reference station, a cloud computing server). In this variation, Steps S220 through S240 may additionally be performed on the remote computer.

Step S220 includes receiving a phase correction (or phase observation) signal from a reference station. Step S220 functions to receive phase correction information used to determine, for a given satellite signal, the location of the mobile receiver. Step S220 preferably includes receiving phase correction information for each satellite signal received in Step S210, but may additionally or alternatively include receiving phase correction information for only a subset of the satellite signals received in Step S210.

If Step S220 include receiving phase correction information for only a subset of satellite signals in Step S210, Step S220 may include estimating phase correction information for any of the subset of satellite signals for which phase correction information is not received.

Step S220 includes receiving phase correction information from at least one reference station, but may also include receiving phase correction information from additional reference stations.

Step S220 may include receiving phase correction information for some satellites from one reference station while receiving phase correction information for other satellites from another reference station. Additionally or alternatively, Step S220 may include receiving phase correction information from multiple reference stations for a single satellite signal.

Step S220 preferably include receiving phase correction signals over a UHF radio (e.g., at 915 MHz), but may additionally or alternatively include receiving phase correction signals over any suitable communication medium (e.g., an internet connection, a cellular connection).

Phase correction signals preferably include carrier signal phase (as measured at the reference station) and reference station location information (or other identifying information linked to location). Phase correction signals may additionally include pseudo-range data from the reference station, positioning code data, or any other relevant data.

Phase correction signals are preferably formatted as RTCMv3 messages, but may additionally or alternatively be formatted according to any suitable standard or method. Reference stations used for transmitting phase correction signals may include dedicated RTK reference stations, Continuously Operating Reference Stations (CORS), Network RTK solutions (including virtual reference station solutions), or any other suitable reference station.

Step S230 includes calculating integer phase ambiguity. Step S230 functions to allow for determination of the absolute difference in phase between a satellite carrier signal received at a reference station and a satellite carrier signal received at a mobile receiver, which in turn enables the position of the mobile receiver relative to the reference station to be calculated.

Integer phase ambiguity is preferably calculated using double differenced measurements of pseudo-range and relative phase. Double-differenced measurements are preferably calculated by taking the difference of values for the difference of receiver and reference values. For example, the double-differenced measurements of pseudo range and phase for two satellites (satellite 1 and 2) can be modeled as $$\rho_{12}=(\rho_{mr}-\rho_{ref})_{i=1}-(\rho_{mr}-\rho_{ref})_{i=2}$$

$$\varphi_{12}=(\varphi_{mr}-\varphi_{ref})_{i=1}-(\varphi_{mr}-\varphi_{ref})_{i=2}$$

where i is the satellite index, $\rho_{mr}, \varphi_{mr}$ are pseudo-range and phase measurements at the mobile receiver, and $\rho_{ref}, \varphi_{ref}$ are pseudo-range and phase measurements at the reference station.

More specifically, for a mobile receiver and a reference station separated by a vector b, the double differenced equations for pseudo-range $\rho$ and phase $\varphi$ can be written as $$\nabla \Delta \rho = \begin{pmatrix} \rho_{10} \\ \vdots \\ \rho_{n0} \end{pmatrix} = \begin{pmatrix} e_1 - e_0 \\ \vdots \\ e_n - e_0 \end{pmatrix} \cdot b + \epsilon_\rho = DE \cdot b + \epsilon_\rho$$

$$\nabla \Delta \phi = \begin{pmatrix} \phi_{10} \\ \vdots \\ \phi_{n0} \end{pmatrix} = \frac{DE \cdot b}{\lambda} + N + \epsilon_\rho$$

where $e_n$ is the unit line of sight vector to satellite n, $\epsilon_p$ represents noise, $\lambda$ is the wavelength of the carrier signal and N is integer phase ambiguity. The use of double-differenced measurements allows for the cancellation of satellite clock errors, receiver clock errors, and some atmospheric error.

Step S230 preferably includes two substeps: generating a set of hypotheses S231 and performing hypothesis testing on the set of hypotheses S232. Additionally or alternatively, S230 may include calculating integer phase ambiguity N using any number or type of steps.

Step S231 functions to produce a set of possible values for N as well as perform iterative refinement on that set. Step S231 preferably includes producing a set of possible values for N using a Kalman filter process.

Kalman filters are recursive filters that estimate the state of a linear dynamic system based on a series of noisy measurements. In general form, the measurement equation appears as $$z_i = H_i x_i + v_i$$

where $z_i$ is the measurement at time (or step) i, $x_i$ is the true state, $v_i$ is observation noise (zero mean and with known covariance), and $H_i$ is the observation model that maps the true state space into the observed space. The Kalman filter model further assumes that there is a relationship between states at different times given by $$x_i = F_i x_{i-1} + w_i$$

where $w_i$ is process noise (also zero mean and with known covariance) and $F_i$ is the transition model that maps true state at time i−1 to true state at time i.

In particular, Step S231 preferably includes producing a set of possible values for N using a type of Kalman filter known as a Bierman-Thornton filter; additionally or alternatively, Step S231 may use any suitable process to produce possible values for N.

Starting with the equation $$\begin{pmatrix} \nabla \Delta \phi_i \\ \lambda \nabla \Delta \phi_i - \nabla \Delta \rho_i \end{pmatrix} = \begin{pmatrix} \frac{1}{\lambda} DE_i & I \\ 0 & \lambda I \end{pmatrix} \begin{pmatrix} b_i \\ N \end{pmatrix}$$

and noting that
for any matrix A operating on a normally distributed random variable x with covariance $\Sigma$, the random variable y=Ax will have covariance $A \Sigma A^T$,
for the matrix A there are subspaces Ker[A] for which any vectors $x \in Ker[A]$ have the property 0=Ax a matrix $Q_i$ can be constructed such that $0 = Q_i DE_i$ and this matrix can be applied to form a second equation:

$$\begin{pmatrix} Q_i \nabla \Delta \phi_i \\ \lambda \nabla \Delta \phi_i - \nabla \Delta \rho_i \end{pmatrix} = \begin{pmatrix} \frac{1}{\lambda} Q_i DE_i & Q_i \\ 0 & \lambda I \end{pmatrix} \begin{pmatrix} b_i \\ N \end{pmatrix} = \begin{pmatrix} 0 & Q_i \\ 0 & \lambda I \end{pmatrix} \begin{pmatrix} b_i \\ N \end{pmatrix} = \begin{pmatrix} Q_i \\ \lambda I \end{pmatrix} N$$

This equation relates phase change and pseudo-range directly to N (without inclusion of the baseline vector b). This equation can be used as the measurement equation of the Kalman filter of Step S231 without a corresponding dynamic transition model. Calculating the value of N directly (instead of attempting to calculate a Kalman filtered baseline) allows baseline states to be removed from the filter; because N is constant, no dynamic transition model is needed. Removing the requirement for the dynamic transition model can substantially reduce the time and/or memory required to compute solutions, additionally, errors that might occur in a dynamic model cannot be explained away as errors in estimates of N.

Computing $Q_i$ requires knowledge of the line of sight vectors contained in $DE_i$. Step S231 preferably includes computing the line of sight vectors from an estimate of b, (which, while not directly calculated in previous calculations, can be found using a set of phase measurements and an estimate for N). Estimates of b are preferably found as in Step S240, but may additionally or alternatively be found by any suitable method. Additionally or alternatively, Step S231 may include computing the line of sight vectors from reference station data, or in any other suitable manner.

For a particular set of line of sight vectors, $Q_i$ is preferably computed by generating a matrix whose rows form a basis for the left null space of DE, or Ker[$DE^T$]. This generation is preferably done via QR decomposition, but may additionally or alternatively be performed using singular value decomposition or any other suitable method.

From these equations, a set of hypotheses can be generated. Measurements arising from ambiguity vector N are expected to be normally distributed and to have a mean given by the equation $$\begin{pmatrix} Q_i \nabla \Delta \phi_i \\ \lambda \nabla \Delta \phi_i - \nabla \Delta \rho_i \end{pmatrix} = \begin{pmatrix} Q_i \\ \lambda I \end{pmatrix} N$$

The corresponding covariance is determined from the results of the Kalman filter of Step S231, reducing the set of likely hypotheses (as compared to covariance derived directly from the measurement model). From this information, a distribution of the set of hypotheses can be found.

Ideally, all hypotheses within a particular confidence interval are tested. The number of hypotheses contained within this interval (hereafter referred to as the testing set) is dependent on the covariance for the N distribution. Since N needs to be computed for several satellites to determine position of the mobile receiver, the total set of hypotheses that need to be tested depends both on the covariances for each satellite's associated N value, but also the number of satellites.

Figure 5A:
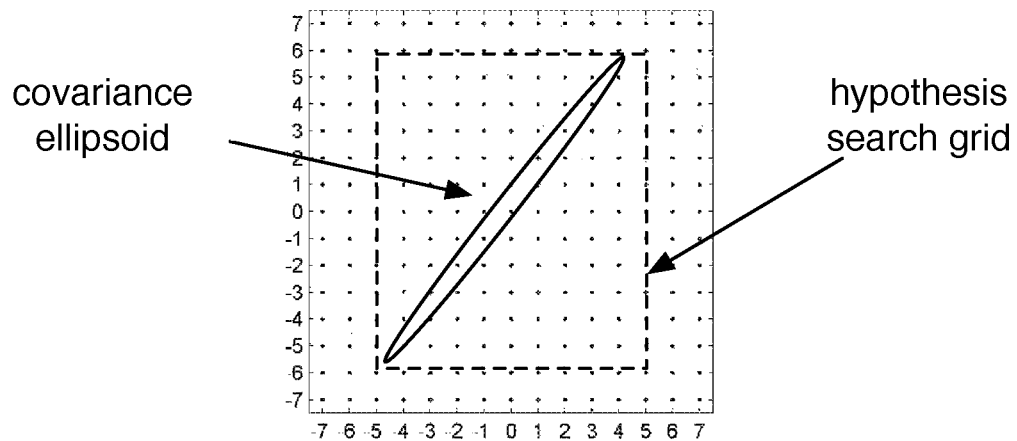
FIGS. 5A, 5B, and 5C are example views of a transformation of a method of a preferred embodiment.
Figure 5B:
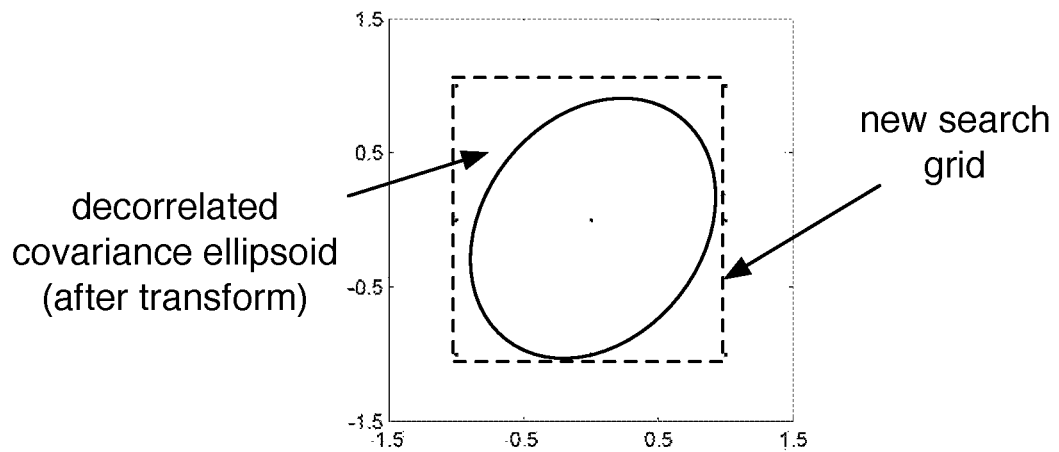
Figure 5C:
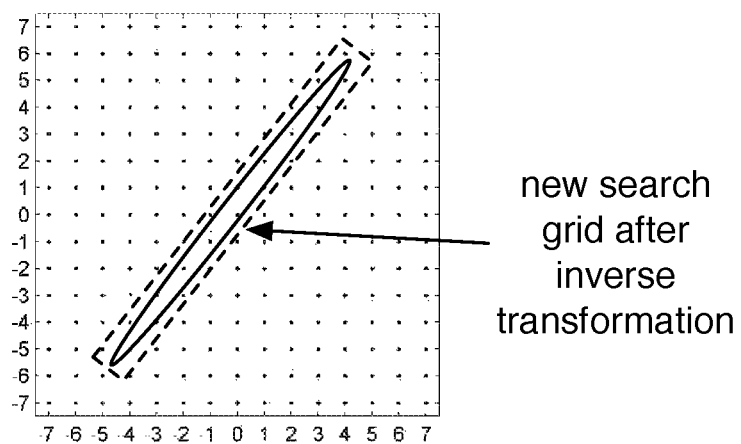

Hypotheses are preferably bounded (for a particular confidence interval) by an ellipsoid defined by the covariance matrix. The ellipsoid defined by the covariance matrix is often extremely elongated, resulting a time and computation intensive hypothesis generation process. To reduce the time and computational resources required to perform this process, Step S231 may include performing a decorrelating reparameterization on the hypothesis search space, as shown in FIGS. 5A, 5B, and 5C. Performing this reparameterization transforms the hypothesis space such that the elongated ellipsoid is transformed to an approximate spheroid; this transformation allows hypotheses to be identified substantially more easily. The hypotheses can then be transformed by an inverse transformation (inverse of the original reparameterization) to be returned to the original coordinate space.

Step S231 preferably includes generating hypotheses for the testing set according to memory limits on the mobile receiver. For example, if a receiver features 64 kB of memory for storing hypotheses and storing initial hypotheses for eight satellites requires 70 kB (while storing initial hypotheses for 7 satellites requires only 50 kB), Step S231 may include generating a set of initial hypotheses for 7 satellites, and then adding hypotheses for the eighth satellite after enough of the initial hypotheses for the 7 satellites have been eliminated. S231 may additionally or alternatively include waiting for the covariance of the Kalman filter's estimate to shrink before generating hypotheses if the current covariances are large enough that memory cannot store testing sets at some threshold confidence level for at least four satellites.

Though Step S231 is preferably performed before Step S232 is performed for the first time, Step S231 may be performed again at any suitable time to modify the set of hypotheses tested. For example, as the probabilities for each set of hypotheses are refined by Step S232, hypotheses may be added to or subtracted from the testing set by Step S231. For example, if Step S231 produces a testing set A and later adds a testing set B containing new satellites, the new testing set may be generated by taking the Cartesian/outer product of A and B, where probabilities are initialized via $$P(A, B) = \frac{P(A)}{|B|}$$

where the denominator is the number of hypotheses in set B and P(A) is the probability of A generated in Step S232. Step S232 may include initializing probabilities via P(A,B)=P(A) (as Step S232 preferably tracks relative probabilities as opposed to absolute probabilities). If Step S231 includes dropping a satellite (e.g., if the satellite can no longer be tracked), this can be accounted for by marginalizing hypotheses via $P(A)=\Sigma_{B\in\mathcal{B}} P(A,B)$ over all hypotheses still in the set. Step S232 preferably includes tracking probabilities in log space; for $l_i=\ln [p_i]$:

$$\ln [p_1+p_2]=\ln [e^{l_1}+e^{l_2}]=l_1+\ln [1+e^{l_1-l_2}]$$

Step S232 preferably includes approximating the logarithm term of $l_1+\ln [1+e^{l_1-l_2}]$ via Taylor series in probability or log probability space; additionally or alternatively, the logarithm term may be estimated as zero as the exponential term may be very small compared to 1. This approximation may result in reducing computation time and/or memory.

Step S232 functions to test the hypotheses of the refined set generated by Step S231 in order to identify the hypothesis corresponding to the actual value of N. Step S231 preferably includes generating hypotheses using LAMBDA or MLAMBDA algorithms using the means and covariances generated by a Kalman filter, but may additionally or alternatively include generating hypotheses using any other mean or covariance estimate of N or according to any suitable algorithm. Step S232 preferably includes testing hypotheses using a variation of the following Bayesian update formula for a hypothesis h given an observation y:

$$\ln [P_i(h)]=l_i(h)=l_{i-1}(h)+\ln [P(y_i|h)]\eta_i$$

where $$\eta_i = \ln\left[\sum_{h\in\mathcal{H}} P(y_i | h)P_{i-1}(h)\right]$$

Variables to be used in this equation are preferably defined according to the following definitions:

$$r_i = \tilde{Q}_i\begin{pmatrix}\nabla\Delta\phi_i \\ \nabla\Delta\rho_i\end{pmatrix}; \tilde{Q}_i = \begin{pmatrix}Q_i & 0 \\ \lambda I & -I\end{pmatrix}$$

where $r_i$ is distributed with mean and covariance $$\bar{r}_{iN} = \begin{pmatrix}Q_i \\ \lambda I\end{pmatrix}N; \Sigma_i = \tilde{Q}_i\mathrm{Cov}\left[\begin{pmatrix}\nabla\Delta\phi_i \\ \nabla\Delta\rho_i\end{pmatrix}\right]\tilde{Q}_i^T$$

For observations $y_i=r_i$ and hypotheses h=N, the previous hypothesis update formula can be written as $$l_i(N)=l_{i-1}(N)-\chi_i^2(N)+\ln [k_i]-\Sigma_i;\chi_i^2(N)=(r_i-\bar{r}_{iN})^T\Sigma_i^{-1}(r_i-\bar{r}_{iN})$$

where $k_i$ is the scaling factor in the normal distribution.

Step S232 preferably includes running the hypothesis test above until the ratio between the probabilities of the best two hypotheses reaches a set threshold, additionally or alternatively, Step S232 may include stopping the hypothesis test based on any other suitable condition (e.g., time).

Step S232 may additionally or alternatively include dropping hypotheses from further testing if their associated pseudo-likelihood, given by $$l_i''(N) = l_{i-1}''(N) - \chi_i^2(N) - l\max_i;$$
$$l\max_i = \max_N [l_{i-1}''(N) - \chi_i^2(N)]$$

is less than some set threshold, the likelihood ratio test may be performed in single precision for speed and numerical stability. Additionally or alternatively, Step S232 may include using any other suitable metric for removing unlikely hypotheses; for example, removing hypotheses with a probability ratio (relative to the best hypothesis) below some threshold value.

Step S232 preferably includes calculating $\Sigma_i$ and $r_i$ only once per observation step, as opposed to once per hypothesis N; additionally or alternatively, Step S232 may include calculating these at any suitable time.

Step S240 includes calculating receiver position. Step S240 functions to calculate the position of the mobile receiver based on the value for N computed in Step S230. After N has been determined, the baseline vector b for the mobile receiver is determined from the value(s) for N and phase/pseudo-range measurements by Step S240; this gives the position of the mobile receiver relative to a reference station. If the location of the reference station is known, Step S240 may include calculating absolute position of the mobile receiver (by applying b to the reference station coordinates).

Step S240 may additionally include transmitting or storing receiver position data. For instance, Step S240 may include transmitting receiver position data from the receiver to an external computer over UHF radio, the internet, or any other suitable means.

All steps of the method 200 are preferably performed on a mobile receiver, but additionally or alternatively, any step or set of steps may be performed on a remote platform (e.g., cloud computing servers if the mobile receiver has internet access).

The methods of the preferred embodiment and variations thereof can be embodied and/or implemented at least in part as a machine configured to receive a computer-readable medium storing computer-readable instructions. The instructions are preferably executed by computer-executable components preferably integrated with an RTK-capable mobile GNSS receiver. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for Real Time Kinematic satellite positioning comprising:
    at a mobile receiver, receiving a first navigation satellite carrier signal from a first navigation satellite, receiving a second navigation satellite carrier signal from a second navigation satellite, receiving a third navigation satellite carrier signal from a third navigation satellite, and receiving a fourth navigation satellite carrier signal from a fourth navigation satellite;
    at the mobile receiver, receiving first, second, third, and fourth phase correction signals from a reference station;
    at the mobile receiver, calculating a set of integer phase ambiguities from double-differenced measurements of pseudo-range and phase; wherein calculating the set of integer phase ambiguities comprises generating a first set of integer phase ambiguity hypotheses using a Kalman filter and performing hypothesis testing on the first set of integer phase ambiguity hypotheses; wherein generating the first set of integer phase ambiguity hypotheses comprises generating the first set of integer phase ambiguity hypotheses using means and covariances generated by a Bierman-Thornton filter and at least one of a LAMBDA and an MLAMBDA algorithm; wherein generating the first set of integer phase ambiguity hypotheses comprises generating the first set of integer phase ambiguity hypotheses from a measurement equation that relates phase change and pseudo-range to integer ambiguity without inclusion of a baseline vector; wherein generating the first set of integer phase ambiguity hypotheses comprises generating the first set of integer phase ambiguity hypotheses without a dynamic transition model; and
    at the mobile receiver, calculating a position of the mobile receiver from the set of integer phase ambiguities and the double-differenced measurements of pseudo-range and phase.

2. The method of claim 1, wherein receiving a navigation satellite carrier signal comprises receiving a first GPS signal on an L1 frequency.

3. The method of claim 2, wherein receiving a navigation satellite carrier signal further comprises receiving a second GPS signal on an L2 frequency and combining the first and second GPS signals to create a beat signal.

4. The method of claim 1, further comprising receiving a set of additional phase correction signals from a second reference station; wherein calculating the position of the mobile receiver comprises calculating the position of the mobile receiver at least in part on the set of additional phase correction signals.

5. The method of claim 1, wherein receiving the first, second, third, and fourth phase correction signals comprises receiving the first, second, third, and fourth phase correction signals from a UHF radio.

6. The method of claim 1, wherein generating the first set of integer phase ambiguity hypotheses further comprises performing a decorrelating reparameterization of a hypothesis search space.

7. The method of claim 6, wherein performing hypothesis testing comprises performing hypothesis testing using a Bayesian update algorithm.

8. The method of claim 7, wherein performing hypothesis testing comprises performing hypothesis testing comprises removing a hypothesis from further testing based on a pseudo-likelihood of the hypothesis passing a threshold value.

9. The method of claim 8, wherein performing hypothesis testing comprises ceasing hypothesis testing when a ratio of probability of a most likely hypothesis to probability of a second-most likely hypothesis passes a threshold value.

10. The method of claim 9, further comprising generating a second set of integer phase ambiguity hypotheses after hypotheses from the first set of integer phase ambiguity hypotheses have been removed from further testing.

11. The method of claim 10, wherein generating the second set of integer phase ambiguity hypotheses comprises generating the second set of integer phase ambiguity hypotheses in response to a hypothesis search space becoming smaller than a threshold value.

12. The method of claim 11, wherein calculating the set of integer phase ambiguities comprises tracking relative probabilities in logarithmic space.

13. A method for Real Time Kinematic satellite positioning comprising:
    at a mobile receiver, receiving a first navigation satellite carrier signal from a first navigation satellite, receiving a second navigation satellite carrier signal from a second navigation satellite, receiving a third navigation satellite carrier signal from a third navigation satellite, and receiving a fourth navigation satellite carrier signal from a fourth navigation satellite;
    at the mobile receiver, transmitting carrier signal data corresponding to the first, second, and third navigation satellites from the mobile receiver to a remote computer;
    at the remote computer, receiving first, second, third, and fourth phase correction signals from a reference station;
    at the remote computer, calculating a set of integer phase ambiguities from double-differenced measurements of pseudo-range and phase; wherein calculating a set of integer phase ambiguities comprises generating a first set of integer phase ambiguity hypotheses using means and covariances generated by a Bierman-Thornton filter and at least one of a LAMBDA and an MLAMBDA algorithm; and performing hypothesis testing on the first set of integer phase ambiguity hypotheses; wherein generating the first set of integer phase ambiguity hypotheses comprises generating the first set of integer phase ambiguity hypotheses from a measurement equation that relates phase change and pseudo-range to integer ambiguity without inclusion of a baseline vector; wherein generating the first set of integer phase ambiguity hypotheses comprises generating the first set of integer phase ambiguity hypotheses without a dynamic transition model; and at the remote computer, calculating a position of the mobile receiver from the set of integer phase ambiguities and the double-differenced measurements of pseudo-range and phase.

14. The method of claim 13, wherein generating the first set of integer phase ambiguity hypotheses further comprises performing a decorrelating reparameterization of a hypothesis search space.

15. The method of claim 14, wherein performing hypothesis testing comprises performing hypothesis testing using a Bayesian update algorithm.

* * * * *